US012637149B2

(12) United States Patent
Purcell et al.

(10) Patent No.: US 12,637,149 B2
(45) Date of Patent: May 26, 2026

(54) OFF-ROAD VEHICLES HAVING A FORWARDLY TILTABLE CARGO BED

(71) Applicant: Arctic Cat Inc., Thief River Falls, MN (US)

(72) Inventors: Lucas Grant Purcell, Thief River Falls, MN (US); Thomas Robert Brausen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 466 days.

(21) Appl. No.: 18/127,521

(22) Filed: Mar. 28, 2023

(65) Prior Publication Data

US 2024/0326931 A1     Oct. 3, 2024

(51) Int. Cl.
*B62D 33/04* (2006.01)
*B62D 21/18* (2006.01)
*B62D 33/027* (2006.01)
*B62D 43/02* (2006.01)

(52) U.S. Cl.
CPC ......... *B62D 33/046* (2013.01); *B62D 21/183* (2013.01); *B62D 33/0276* (2013.01); *B62D 43/02* (2013.01)

(58) Field of Classification Search
CPC ......... B62D 33/046; B60R 5/04; B60R 9/065; B60R 2011/004; B60J 7/1621
See application file for complete search history.

(56) References Cited

U.S. PATENT DOCUMENTS

| | | | | |
|---|---|---|---|---|
| 3,273,767 A | * | 9/1966 | Moore | B60R 9/06 |
| | | | | 224/558 |
| 4,948,024 A | * | 8/1990 | Warner | B60R 9/042 |
| | | | | 224/310 |
| 6,234,559 B1 | * | 5/2001 | Block | B60J 7/1621 |
| | | | | 296/100.06 |
| 8,668,246 B2 | | 3/2014 | Gagnon et al. | |
| 9,555,702 B2 | | 1/2017 | Olli | |
| 10,479,290 B2 | | 11/2019 | Simard et al. | |
| 2002/0005651 A1 | * | 1/2002 | Young | B60J 7/1621 |
| | | | | 296/100.1 |
| 2006/0170236 A1 | * | 8/2006 | Porter | B60R 5/04 |
| | | | | 296/37.16 |
| 2020/0122571 A1 | * | 4/2020 | Anderson | B60K 15/03006 |
| 2022/0063517 A1 | * | 3/2022 | Myszkowski | B60R 7/02 |

(Continued)

FOREIGN PATENT DOCUMENTS

WO     2024006447 A1     1/2024

*Primary Examiner* — Daniel J Colilla
(74) *Attorney, Agent, or Firm* — Billion & Armitage

(57) ABSTRACT

An off-road vehicle includes a frame assembly, a powertrain, a plurality of wheels and a seat assembly. A cargo box is coupled to the frame assembly aft of the seat assembly. The cargo box includes a floor and a plurality of side walls. A cargo bed is pivotally coupled relative to the cargo box about a forward hinge. The cargo bed includes a floor and a plurality of side walls forming an upper storage space. The cargo bed is tiltable between a closed position, in which the cargo bed is a cover for the cargo box forming a lower storage space within the cargo box below the cargo bed, and an open position, in which the cargo bed provides access to the lower storage space. An optional accessory rack is pivotally coupled relative to the cargo bed and the frame assembly, and is tiltable with the cargo bed.

20 Claims, 8 Drawing Sheets

(56)     References Cited

U.S. PATENT DOCUMENTS

| | | |
|---|---|---|
| 2022/0135145 A1 | 5/2022 | Veillette et al. |
| 2022/0315115 A1 | 10/2022 | Lyons et al. |
| 2024/0351528 A1 | 10/2024 | Hinners et al. |

* cited by examiner

OFF-ROAD VEHICLES HAVING A FORWARDLY TILTABLE CARGO BED

TECHNICAL FIELD OF THE DISCLOSURE

The present disclosure relates, in general, to off-road vehicles that have multiple cargo storage areas and, in particular, to off-road vehicles having a cargo bed that is forwardly tiltable relative to a cargo box between a closed position, in which the cargo bed forms a cover for a cargo box, and an open position, in which the cargo bed provides access to the cargo box.

BACKGROUND

Off-road vehicles are popular land vehicles used to transport persons, cargo and accessories. Such off-road vehicles include all-terrain vehicles (ATV), light utility vehicles (LUV), side-by-side vehicles (SxS), utility-terrain vehicles (UTV), recreational off-highway vehicles (ROV) and multipurpose off-highway utility vehicles (MOHUV), to name a few. Certain off-road vehicles are primarily designed for utility applications and may offer high ground clearance, low gear ratios for towing, racks for hauling large loads, large dump boxes and/or high payload capacity. Other off-road vehicles are primarily designed for recreational applications and may offer high performance engines as well as safety features including rollover protection, hard tops, windshields and/or cab enclosure features such as body panels that restrict occupant egress in the event of a rollover. Off-road vehicles typically have gasoline powered engines, four wheels and are capable to carrying two to four people. While some off-road vehicles have handlebar steering and motorcycle-style seating, many off-road vehicles utilize automobile-style controls such as a steering wheel and foot pedals, and have side-by-side seating for the occupants. Off-road vehicles commonly have front and/or rear suspensions including shock absorbers that damp vibrations and reduce the rocking and swaying experience by the occupants making such off-road vehicles suitable for travel over a diversity of terrains, in various conditions and at an array of speeds.

SUMMARY

In a first aspect, the present disclosure is directed to an off-road vehicle including a frame assembly, a powertrain coupled to the frame assembly and a plurality of wheels rotatably coupled to the frame assembly with at least one of the wheels operatively coupled to the powertrain. A seat assembly is coupled to the frame assembly. A cargo box is coupled to the frame assembly aft of the seat assembly. The cargo box includes a floor and a plurality of side walls. A cargo bed is pivotally coupled relative to the cargo box about a forward hinge. The cargo bed includes a floor and a plurality of side walls forming an upper storage space. The cargo bed is tiltable between a closed position, in which the cargo bed is a cover for the cargo box forming a lower storage space within the cargo box below the cargo bed, and an open position, in which the cargo bed provides access to the lower storage space.

In some embodiments, the plurality of side walls of the cargo box may include a forward side wall, an aft side wall, a left side wall and a right side wall. In such embodiments, the forward side wall, the aft side wall, the left side wall and the right side wall of the cargo box may be independent panels. In certain embodiments, the plurality of side walls of the cargo bed may include a forward side wall, an aft side wall, a left side wall and a right side wall. In such embodiments, the forward side wall, the aft side wall, the left side wall and the right side wall of the cargo bed may be integrally formed with the floor of the cargo bed. In some embodiments, in the closed position, the cargo bed may have a sealing engagement with the cargo box such as a water resistant sealing engagement or a waterproof sealing engagement. In certain embodiments, a locking assembly may be configured to selectively secure the cargo bed to the cargo box in the closed position such that the lower storage space is a secure storage space. In some embodiments, a lift assist element may be disposed between the cargo bed and the cargo box such as a strut or a spring.

In a second aspect, the present disclosure is directed to an off-road vehicle including a frame assembly, a powertrain coupled to the frame assembly and a plurality of wheels rotatably coupled to the frame assembly with at least one of the wheels operatively coupled to the powertrain. A seat assembly is coupled to the frame assembly. A cargo box is coupled to the frame assembly aft of the seat assembly. The cargo box includes a floor and a plurality of side walls. A cargo bed is pivotally coupled relative to the cargo box about a forward hinge. The cargo bed includes a floor and a plurality of side walls forming an upper storage space. The cargo bed is tiltable between a closed position, in which the cargo bed is a cover for the cargo box forming a lower storage space within the cargo box below the cargo bed, and an open position, in which the cargo bed provides access to the lower storage space. An accessory rack is pivotally coupled relative to the cargo bed and the frame assembly such that the accessory rack is positioned above and is tiltable with the cargo bed.

In certain embodiments, a locking assembly is configured to selectively secure the cargo bed to the cargo box in the closed position such that the lower storage space is a secure storage space. In some embodiments, a lift assist element is disposed between the cargo bed and the cargo box. In certain embodiments, the accessory rack may be a tire rack configured to support a spare tire. In some embodiments, a linkage system may include aft links pivotally coupling the accessory rack to the cargo bed and forward links pivotally coupling the accessory rack to the frame assembly. In such embodiments, the linkage system may include a lift assist system such as one or more struts.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
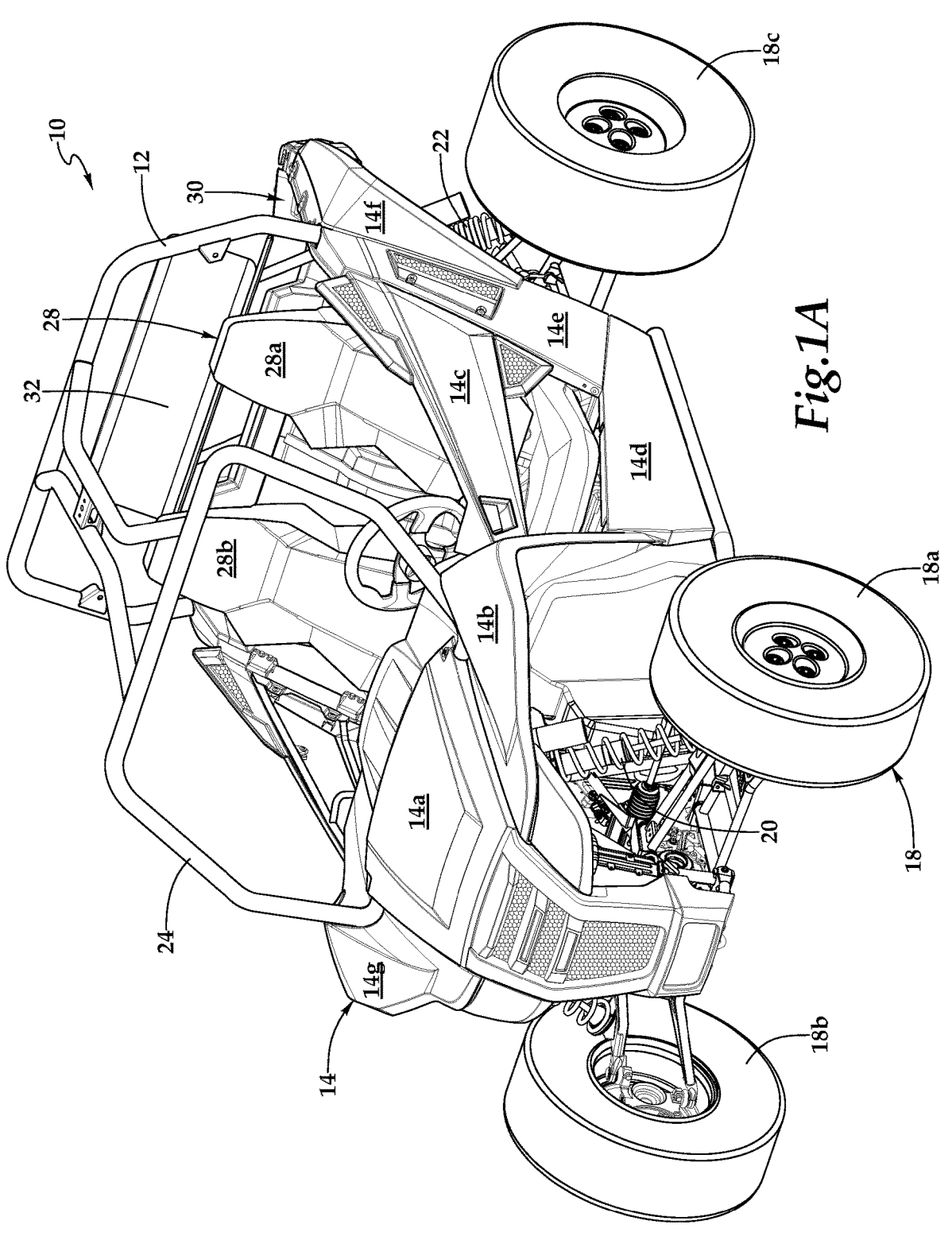
FIGS. 1A-1D are schematic illustrations of an off-road vehicle having a cargo storage system including a forwardly tiltable cargo bed in accordance with embodiments of the present disclosure.
Figure 1B:
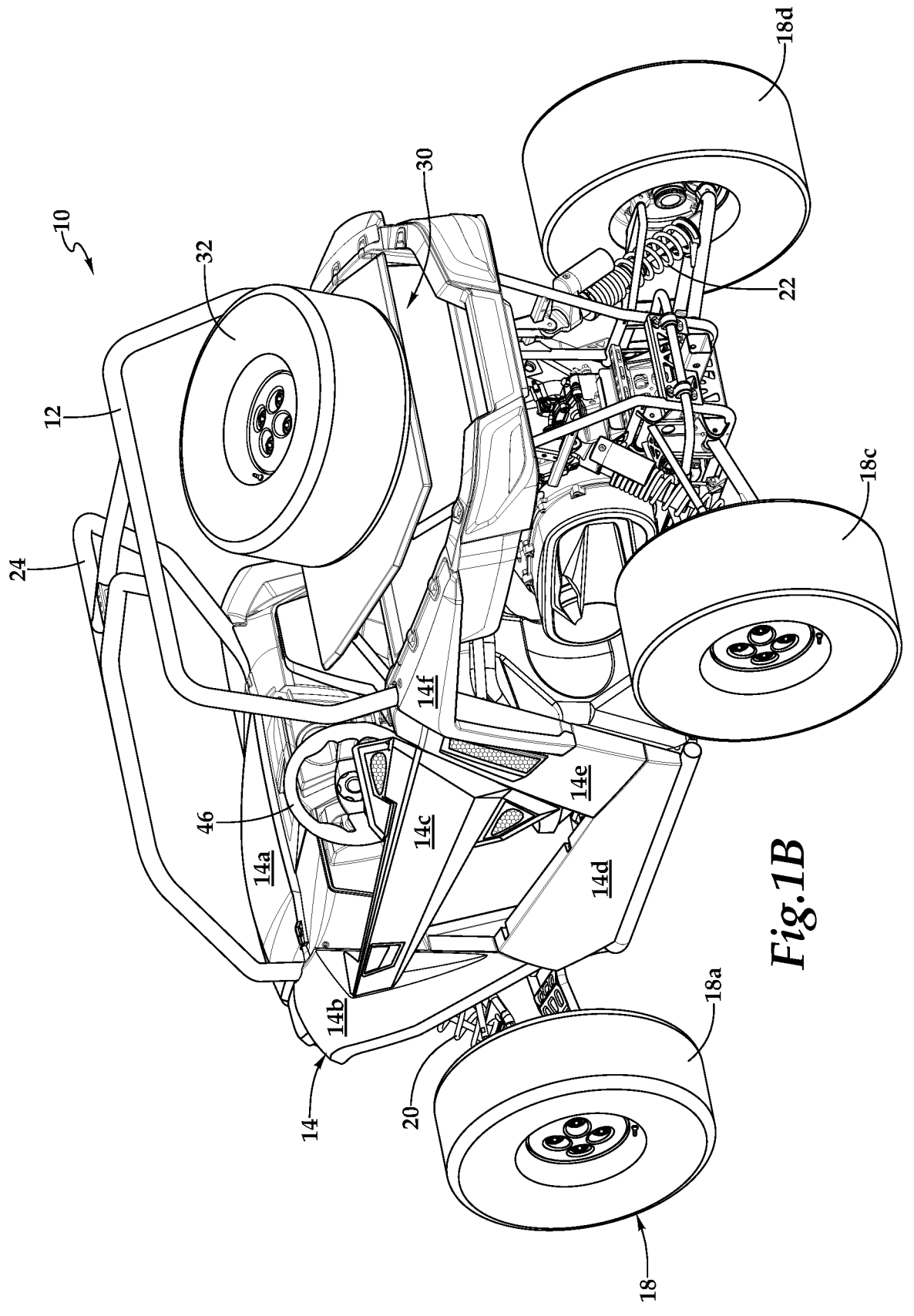
Figure 1C:
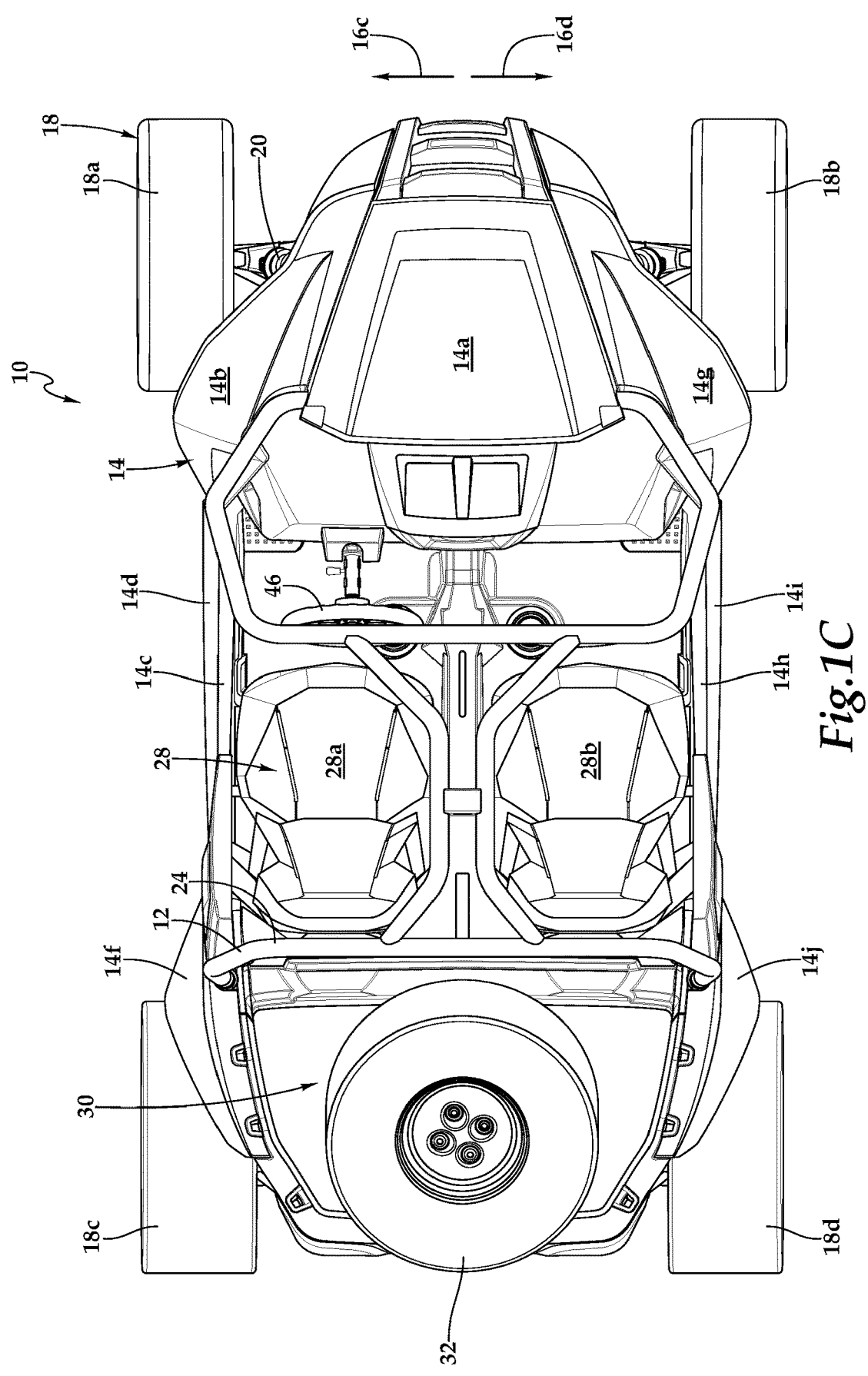

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a land vehicle depicted as an off-road vehicle having a forwardly tiltable cargo bed is schematically illustrated and generally designated 10. In the illustrated embodiment, off-road vehicle 10 is a side-by-side vehicle. In other embodiments, off-road vehicle 10 may be an all-terrain vehicle, a light utility vehicle, a utility-terrain vehicle, a recreational off-highway vehicle, a multipurpose off-highway utility vehicle or the like. Structural support for off-road vehicle 10 is provided by frame assembly 12, on or around which the various components of off-road vehicle 10 are assembled. Frame assembly 12 is formed of a plurality of structural members that are interconnected by welds, bolts, pins, adhesive and/or other suitable fastening means. The structural members may include tubular members, such as round and hollow tubular members, comprised of metal or metal alloy, such as steel or aluminum. Alternatively or additionally, certain structural members may be formed from polymeric materials such as a fiber reinforced polymer composite.

Off-road vehicle 10 includes a plurality of body panels that cover and protect certain components of off-road vehicle 10 such as hood panel 14a, left front fender panel 14b, left door panel 14c, left lower panel 14d, left rear panel 14e and left rear fender panel 14f. It should be understood by those having ordinary skill in the art that off-road vehicle 10 has similar body panels on the right side of the vehicle including right front fender panel 14g, right door panel 14h, right lower panel 14i and right rear fender panel 14j with the body panels of off-road vehicle 10 being collectively referred to herein as body panels 14. Body panels 14 may be formed from sheet metal or metal alloy, such as steel or aluminum, and/or polymeric materials such as fiber reinforced polymer composites. In addition, it should be understood by those having ordinary skill in the art that the right side and the left side of off-road vehicle 10 will be with reference to a forward-facing occupant of off-road vehicle 10 with the right side of off-road vehicle 10 corresponding to the right side of the occupant and the left side of off-road vehicle 10 corresponding to the left side of the occupant. The forward direction of off-road vehicle 10 is indicated by forward arrow 16a and the backward direction of off-road vehicle 10 is indicated by backwards arrow 16b in FIG. 1D. The forward and backward directions also represent the longitudinal direction of off-road vehicle 10 with the lateral direction of off-road vehicle 10 being normal thereto and represented by a leftward arrow 16c and a rightward arrow 16d in FIG. 1C. The backward direction may also be referred to herein as the aftward direction.

Figure 1D:
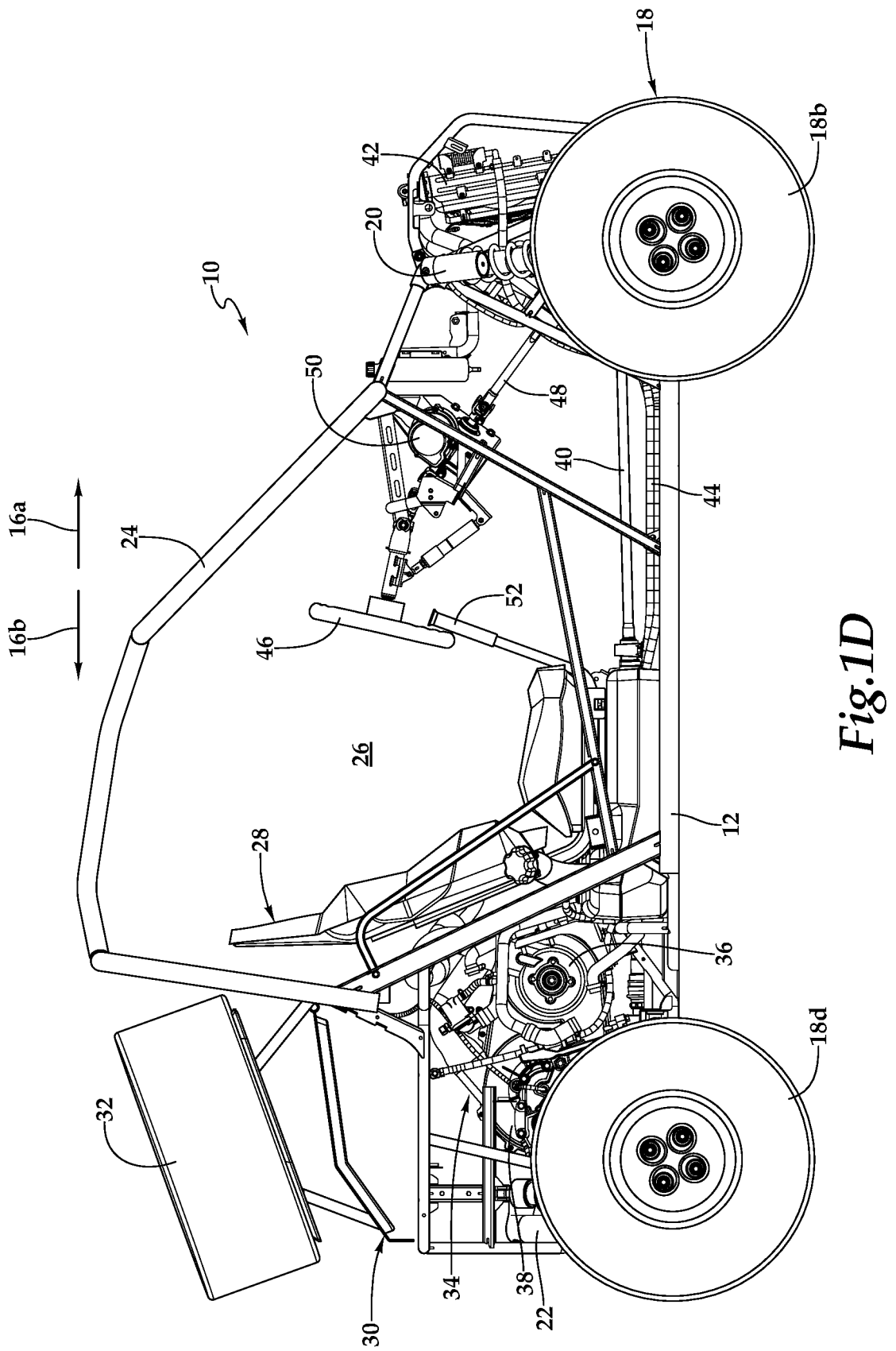

Off-road vehicle 10 includes a plurality of ground engaging members depicted as four wheels 18 including front wheels 18a, 18b that are coupled to frame assembly 12 by a front suspension 20 and rear wheels 18c, 18d that are coupled to frame assembly 12 by a rear suspension 22. Frame assembly 12 includes a rollover protection structure 24 that at least partially defines an occupant space 26 within off-road vehicle 10, as best seen in FIG. 1D. In the illustrated embodiment, occupant space 26 includes a seating assembly 28 depicted as a pair of bucket seats; namely, a driver seat 28a and a passenger seat 28b in a side-by-side arrangement. In other embodiments, the occupant space of an off-road vehicle may have a bench seating arrangement. In still other embodiments, the occupant space of an off-road vehicle may have front and rear seats to accommodate additional occupants such as a total of four, six or more occupants. Positioned aft of seating assembly 28, off-road vehicle 10 includes a cargo storage system 30 including a fixed cargo box, a forwardly tiltable cargo bed and an optional accessory rack depicted as an articulating tire rack for transporting a full-size spare tire 32. In the present embodiments, cargo storage system 30 enables off-road vehicle 10 to have at least two independent cargo storage spaces for simultaneously transporting distinct types of cargo, which can be beneficial for a user of road vehicle 10. The cargo box provides a first cargo storage space which may be referred to herein as a lower storage space or a secure storage space, the forwardly tiltable cargo bed provides a second cargo storage space which may be referred to herein as an upper storage space or an open air storage space and the optional accessory rack provides a third cargo storage space which may be referred to herein as a spare tire storage space.

In FIG. 1D, body panels 14 have been removed from off-road vehicle 10 to better reveal certain additional components of off-road vehicle 10. For example, off-road vehicle 10 has a powertrain 34 that includes an engine 36 and a transmission 38, both of which are coupled to frame assembly 12. Engine 36 may be any type of engine such as a four-stroke engine, an electric motor or other prime mover. Engine 36 may be naturally aspirated or include a power adder such as a supercharger or a turbocharger. Transmission 38 may be a continuously variable transmission, an electrically variable transmission or other suitable transmission type for varying the ratio of the engine output speed to the input speed to wheels 18. In the illustrated embodiment, off-road vehicle 10 is a four-wheel drive vehicle in which powertrain 32 is operatively coupled to front wheels 18*a*, 18*b* via a front differential and to rear wheels 18*c*, 18*d* via a rear differential which is coupled to the front differential via a drive shaft 40. In other embodiments, off-road vehicle 10 may be a two-wheel drive vehicle such as a rear-wheel drive vehicle in which the powertrain is coupled to only the rear wheels or a front-wheel drive vehicle in which the powertrain is coupled to only the front wheels. Off-road vehicle 10 includes a radiator 42 that is coupled to engine 36 via coolant lines 44. Radiator 42 is part of the engine cooling system providing heat exchanger functionality to cool a circulating fluid that is sent through engine 36 to absorb heat, thereby preventing engine overheating.

Positioned within occupant space 26, off-road vehicle 10 includes a steering wheel 46 that is coupled to front wheels 18*a*, 18*b* via a steering linkage 48. In the illustrated embodiment, off-road vehicle 10 includes an electric power steering system 50 that is coupled to steering linkage 48. In other embodiments, off-road vehicle 10 may have hydraulically assisted power steering, electric power steering without a mechanical linkage such as a drive-by-wire system, electric assisted power steering or other suitable steering system. Also disposed within occupant space 26, off-road vehicle 10 includes a gear shift selector 52 that is coupled to transmission 38 and enables the driver to shift off-road vehicle 10 between various diving modes including forward and reverse driving modes.

Figure 2B:
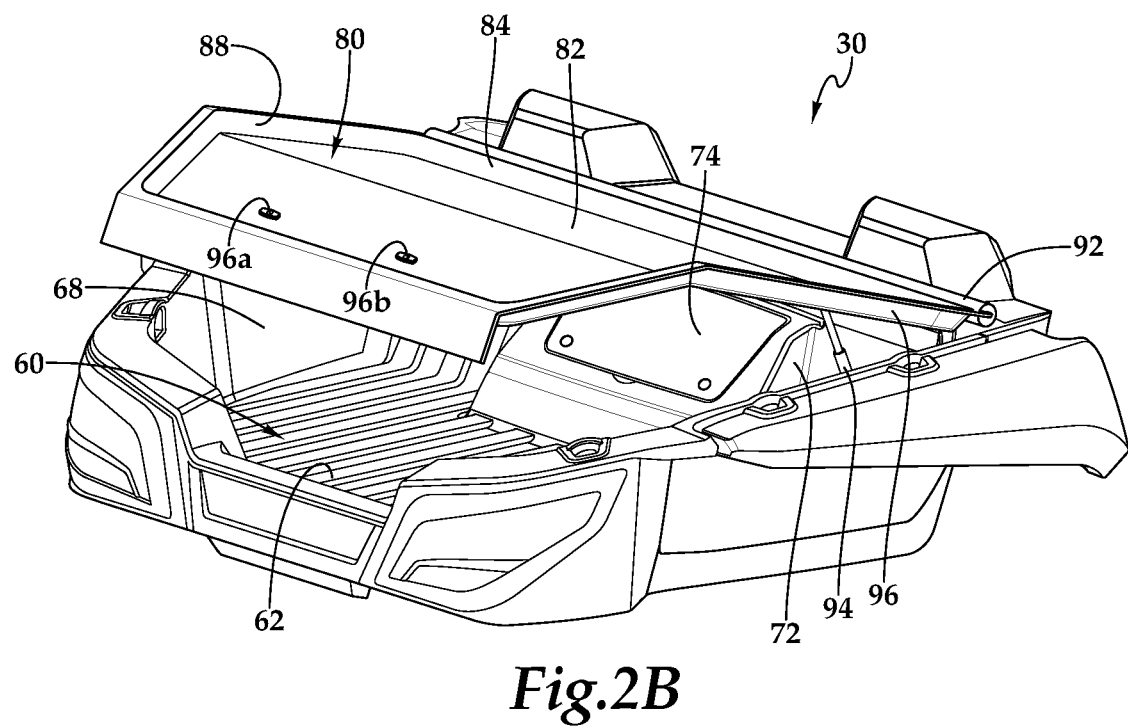
FIGS. 2A-2B are schematic illustrations of a cargo storage system including a forwardly tiltable cargo bed for an off-road vehicle in accordance with embodiments of the present disclosure in the closed and open positions.
Figure 2A:
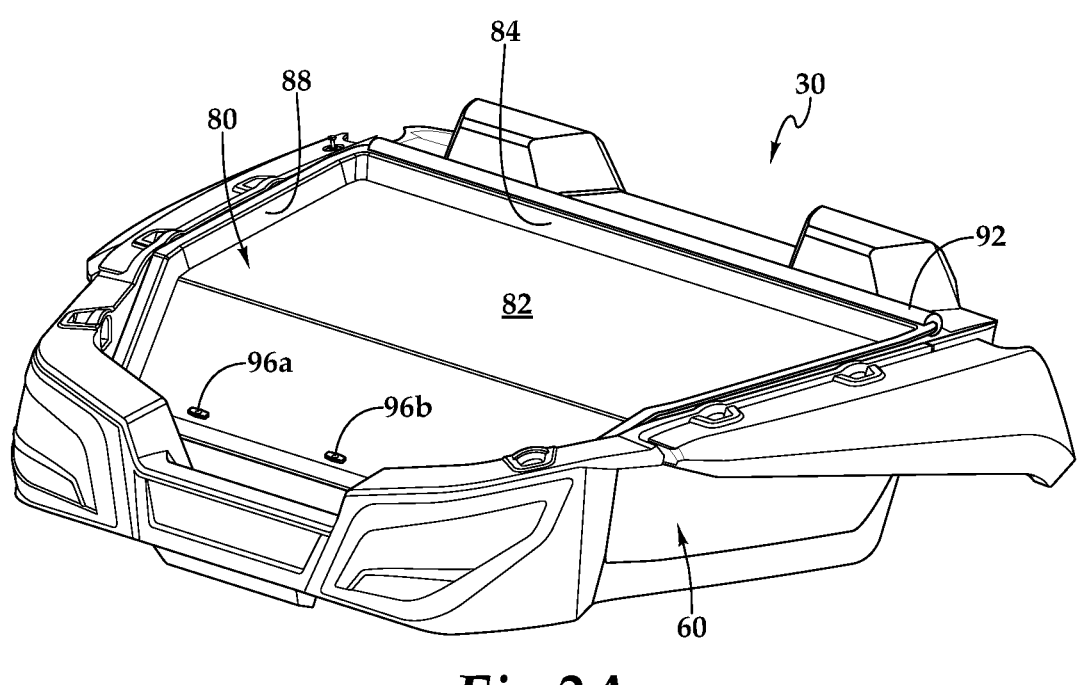
Figure 5:
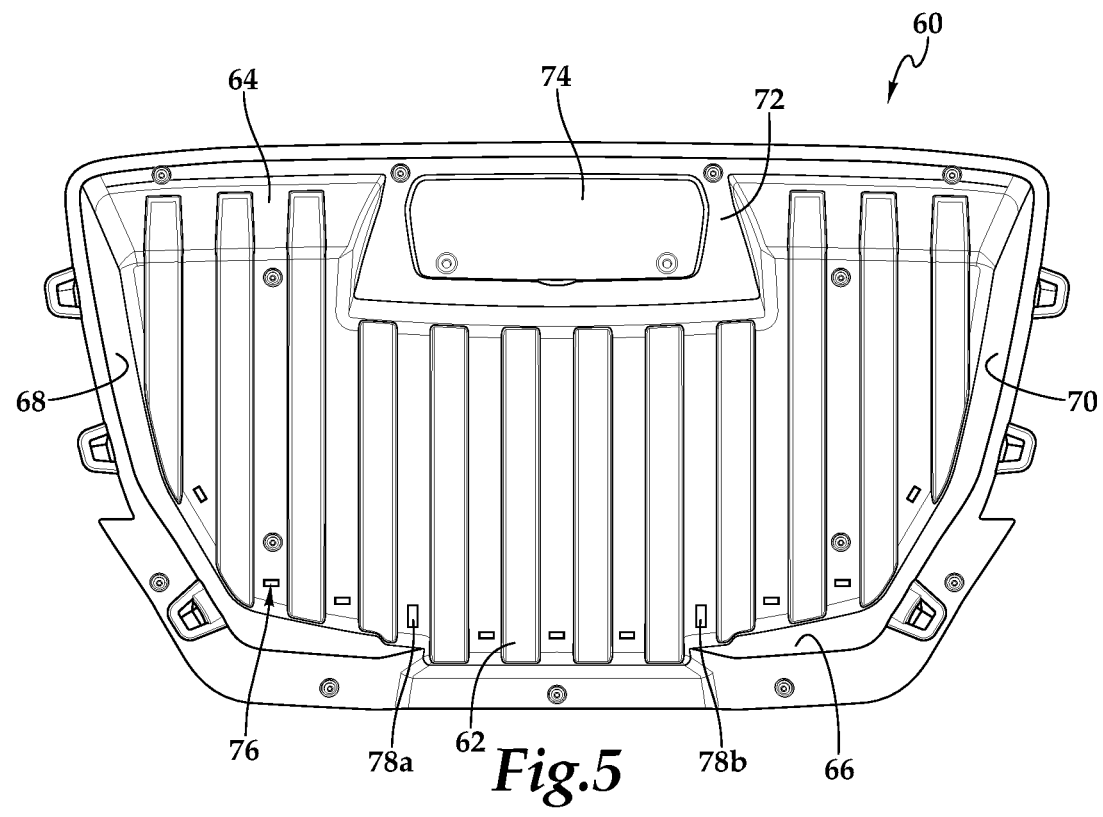
FIG. 5 is a top view of a cargo box for a cargo storage system of an off-road vehicle in accordance with embodiments of the present disclosure.

Referring additionally to FIGS. 2A-2B in the drawings, an embodiment of cargo storage system 30 for an off-road vehicle will be discussed in greater detail. Cargo storage system 30 is coupled to and supported by frame 12 of off-road vehicle 10. Cargo storage system 30 includes a cargo box 60 having a cargo box body depicted as including a floor 62 and a plurality of side walls; namely, a forward side wall 64, an aft side wall 66, a left side wall 68 and a right side wall 70, as best seen in FIG. 5. Floor 62, forward side wall 64, aft side wall 66, left side wall 68 and right side wall 70 may assembled from multiple independent panels or may be integrally formed together. Floor 62, forward side wall 64, aft side wall 66, left side wall 68 and right side wall 70 may be formed from sheet metal or metal alloy, such as steel or aluminum, and/or polymeric materials such as fiber reinforced polymer composites. In the illustrated embodiment, cargo box 60 includes a forward storage container 72 that has an access panel 74 operably associated therewith to enable access to items placed therein. In the closed position, as illustrated in FIG. 5, access panel 74 may provide a water resistant or waterproof seal with forward storage container 72 to exclude the entry of water or other liquids therein. In other embodiments, forward storage container 72 may be omitted from cargo box 60. In the illustrated embodiment, floor 62 of cargo box 60 includes a plurality of drain openings 76 to expel any water or other liquids that gather in cargo box 60. In addition, floor 62 of cargo box 60 includes a pair of receivers 78*a*, 78*b* that form a portion of a locking assembly of cargo storage system 30. Cargo box 60 may include a plurality of anchor points such that tie-down straps or other securing elements may be used to secure cargo against movement within the lower storage space.

Figure 6:
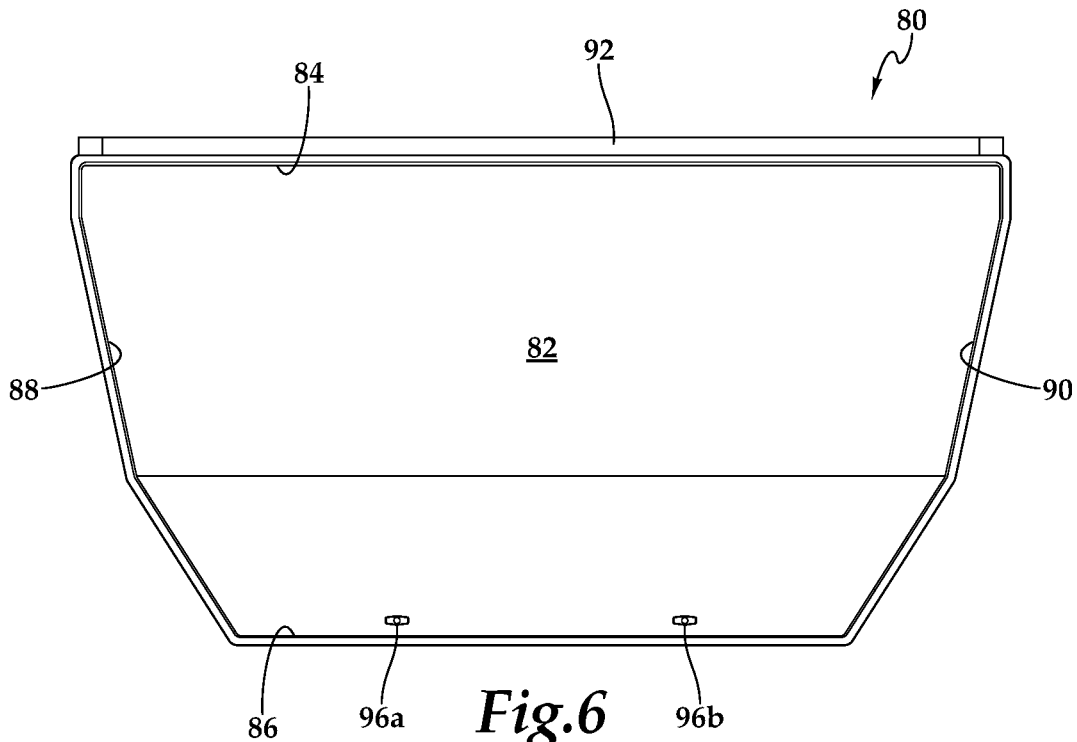
FIG. 6 is a top view of a forwardly tiltable cargo bed for a cargo storage system of an off-road vehicle in accordance with embodiments of the present disclosure.

Cargo storage system 30 includes a cargo bed 80 having a cargo bed body depicted as including a floor 82 and a plurality of side walls; namely, a forward side wall 84, an aft side wall 86, a left side wall 88 and a right side wall 90, as best seen in FIG. 6. Floor 62, forward side wall 84, aft side wall 86, left side wall 88 and right side wall 90 may be integrally formed or may consist of multiple members that are coupled together. Floor 82, forward side wall 84, aft side wall 86, left side wall 88 and right side wall 90 may be formed from sheet metal or metal alloy, such as steel or aluminum, and/or polymeric materials such as fiber reinforced polymer composites. Cargo bed 80 is pivotally coupled relative to cargo box 60 about a forward hinge 92 that may be coupled directly to one or both of cargo box 60 and frame 12 of off-road vehicle 10. In the illustrated embodiment, forward hinge 92 is a spring loaded hinge assembly that is configured as a lift assist element to reduce the force required to operate cargo bed 80 from the closed position, depicted in FIG. 2A, to the open positioned, depicted in FIG. 2B. This lift assist functionality is useful when heavy cargo is positioned in cargo bed 80. In addition, a pair of oppositely disposed struts function as an alternative or addition lift assist element to aid in opening, controlling movement and controlling the range of motion of cargo bed 80, only right strut 94 being visible in FIG. 2B. As best seen in the comparison between FIGS. 2A and 2B, cargo bed 80 is tiltable in the forward direction about forward hinge 92 from a closed position (FIG. 2A), in which cargo bed 80 forms a cover for cargo box 60 defining the lower storage space within cargo box 60 and below cargo bed 80, and an open position (FIG. 2B), in which cargo bed 80 provides access to the lower storage space within cargo box 60. In both the open and closed positions, cargo bed 80 defines the upper storage space above floor 82. As the upper storage space is an open air storage space, cargo bed 80 may include a plurality of anchor points such that tie-down straps or other securing elements may be used to secure cargo onto cargo bed 80. In the illustrated embodiment, cargo bed 80 is sized and designed to have a close fitting and/or sealing relationship with cargo box 60 when cargo bed 80 is in the closed position. For example, cargo bed 80 may have a resilient material disposed about a perimeter 96 to form a water resistant sealing engagement or a waterproof sealing engagement with cargo box 60 when cargo bed 80 is in the closed position. This sealing engagement between cargo bed 80 and cargo box 60 is configured to exclude the entry of water or other liquids into cargo box 60 when cargo bed 80 is in the closed position. In the illustrated embodiment, cargo bed 80 includes a pair of quarter turn locks 96*a*, 96*b* that cooperate with receivers 78*a*, 78*b* of cargo box 80 to form a locking assembly that secures cargo bed 80 to cargo box 60 in the closed position such that the lower storage space is a secure storage space. Quarter turn locks 96*a*, 96*b* may require a key for operation between the locked and unlocked positions or may require simple manual operation.

Figure 3B:
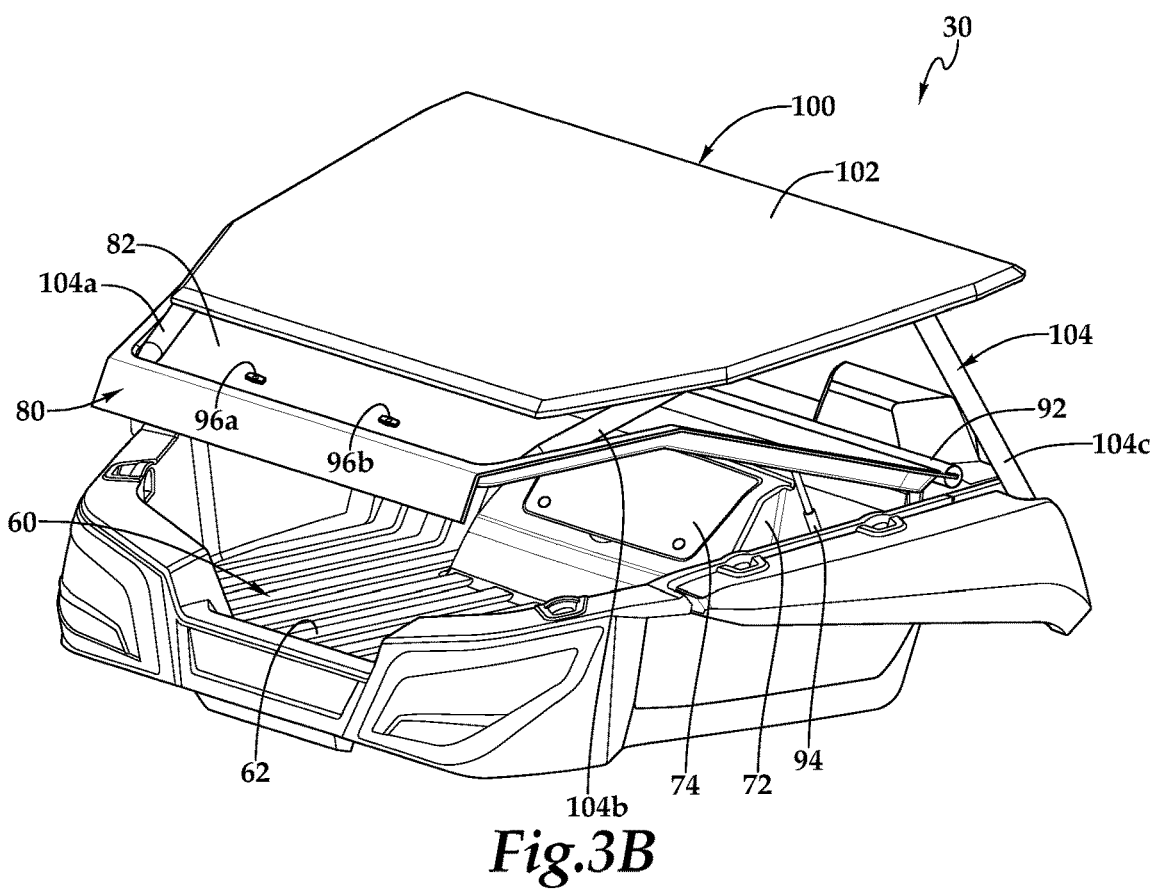
FIGS. 3A-3B are schematic illustrations of a cargo storage system including a forwardly tiltable cargo bed having an accessory rack for an off-road vehicle in accordance with embodiments of the present disclosure in the closed and open positions.
Figure 3A:
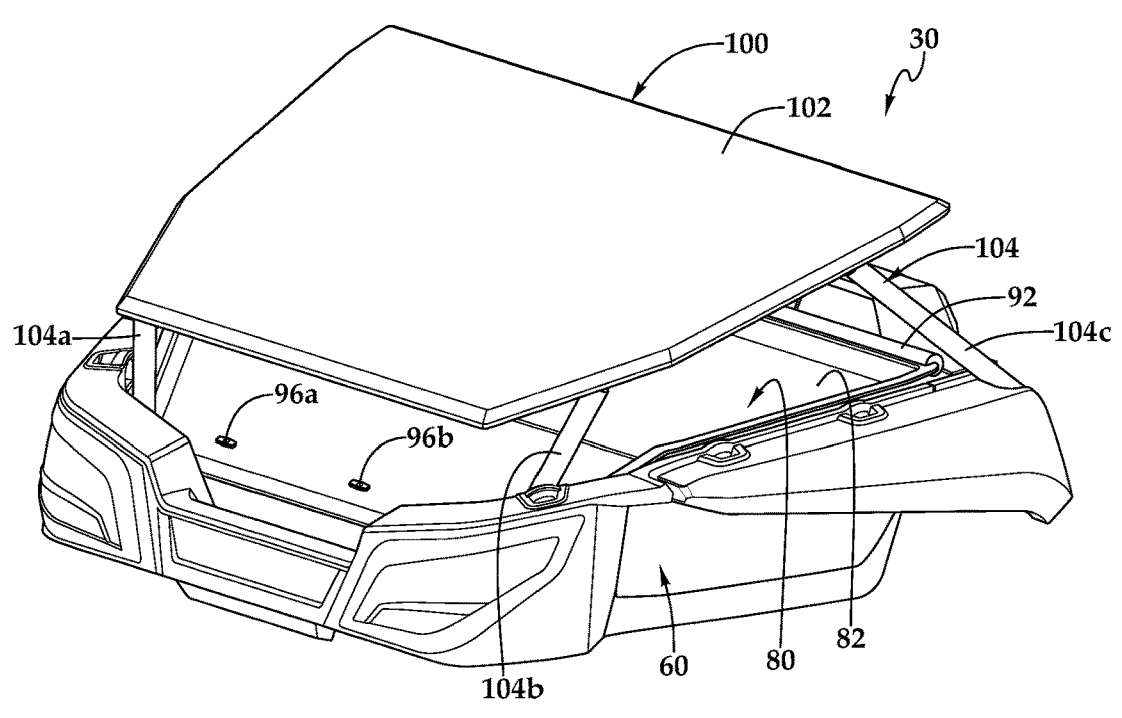

Referring next to FIGS. 3A-3B in the drawings, an embodiment of cargo storage system 30 that includes an accessory rack for an off-road vehicle will be discussed in greater detail. Cargo storage system 30 is coupled to and supported by frame 12 of off-road vehicle 10. Cargo storage system 30 includes cargo box 60 having a cargo box body depicted as including floor 62, forward side wall 64, aft side wall 66, left side wall 68 and right side wall 70 (see FIG. 5). In the illustrated embodiment, cargo box 60 includes forward storage container 72 that has access panel 74 operably associated therewith to enable access to items placed therein. Cargo storage system 30 also includes cargo bed 80 having a cargo bed body depicted as including floor 82, forward side wall 84, aft side wall 86, left side wall 88 and right side wall 90 (see FIG. 6). Cargo bed 80 is pivotally coupled relative to cargo box 60 about forward hinge 92 that may be coupled directly to one or both of cargo box 60 and frame 12 of off-road vehicle 10. Cargo bed 80 may include one or more lift assist elements such as forward hinge 92 being a spring loaded hinge assembly and/or a pair of oppositely disposed struts, only right strut 94 being visible in FIG. 3B.

Cargo storage system 30 further includes an accessory rack 100 having an upper surface 102 for receiving cargo items. Accessory rack 100 may include a plurality of anchor points such that tie-down straps or other securing elements may be used to secure cargo thereon. Alternatively or additionally, accessory rack 100 may have other mounting elements configured to cooperated with cargo items to secure such cargo items to accessory rack 100. In the illustrated embodiment, a linkage system 104 supports accessory rack 100 on top of cargo bed 80. Linkage system 104 includes two aft links 104a, 104b that extend between and are rotatable relative to accessory rack 100 and cargo bed 80. In addition, linkage system 104 includes two forward links, only right forward link 104c being visible, that extend between and are rotatable relative to accessory rack 100 and frame 12 of off-road vehicle 10.

As best seen in the comparison between FIGS. 3A and 3B, cargo bed 80 is tiltable in the forward direction about forward hinge 92 from a closed position (FIG. 3A), in which cargo bed 80 forms a cover for cargo box 60 defining the lower storage space within cargo box 60 and below cargo bed 80, and an open position (FIG. 3B), in which cargo bed 80 provides access to the lower storage space within cargo box 60. In both the open and closed positions, cargo bed 80 defines the upper storage space above floor 82 and below accessory rack 100. Also, in both the open and closed positions of cargo bed 80, accessory rack 100 provides an addition cargo space independent of the lower storage space and the upper storage space. Accessory rack 100 pivots relative to cargo bed 80 as cargo bed 80 transitions between the open and closed position via linkage system 104. The forward and/or aft links of linkage system 104 may be struts that serve as a lift assist system to reduce the force required to open cargo bed 80.

Figures 4A, 4B:
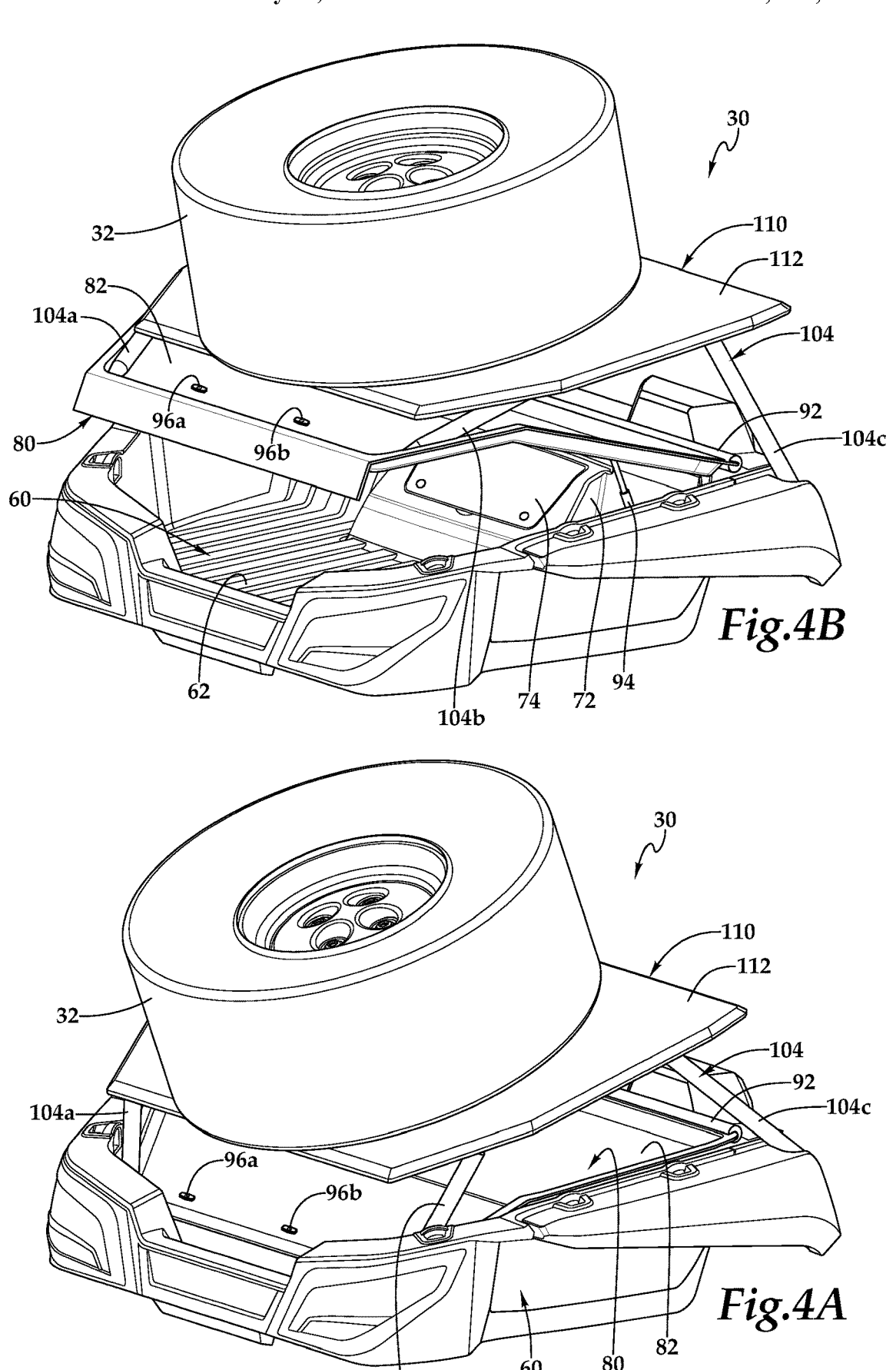
FIGS. 4A-4B are schematic illustrations of a cargo storage system including a forwardly tiltable cargo bed having a tire rack for an off-road vehicle in accordance with embodiments of the present disclosure in the closed and open positions.

Referring next to FIGS. 4A-4B in the drawings, an embodiment of cargo storage system 30 that includes a tire rack for an off-road vehicle will be discussed in greater detail. Cargo storage system 30 is coupled to and supported by frame 12 of off-road vehicle 10. Cargo storage system 30 includes cargo box 60 having a cargo box body depicted as including floor 62, forward side wall 64, aft side wall 66, left side wall 68 and right side wall 70 (see FIG. 5). In the illustrated embodiment, cargo box 60 includes forward storage container 72 that has access panel 74 operably associated therewith to enable access to items placed therein.

Cargo storage system 30 includes cargo bed 80 having a cargo bed body depicted as including floor 82, forward side wall 84, aft side wall 86, left side wall 88 and right side wall 90 (see FIG. 6). Cargo bed 80 is pivotally coupled relative to cargo box 60 about forward hinge 92 that may be coupled directly to one or both of cargo box 60 and frame 12 of off-road vehicle 10. Cargo bed 80 may include one or more lift assist elements such as forward hinge 92 being a spring loaded hinge assembly and/or a pair of oppositely disposed struts, only right strut 94 being visible in FIG. 4B. Cargo storage system 30 also includes a tire rack 110 having an upper surface 112 for receiving a full-size spare tire 32. Tire rack 110 may include openings through which bolts are received to secure spare tire 32 to tire rack 110. Alternatively, tire rack 110 may have other features suitable for securing spare tire 32 thereto. In the illustrated embodiment, a linkage system 104 supports tire rack 110 on top of cargo bed 80. Linkage system 104 includes two aft links 104a, 104b that extend between and are rotatable relative to tire rack 110 and cargo bed 80. In addition, linkage system 104 includes two forward links, only right forward link 104c being visible, that extend between and are rotatable relative to tire rack 110 and frame 12 of off-road vehicle 10.

As best seen in the comparison between FIGS. 4A and 4B, cargo bed 80 is tiltable in the forward direction about forward hinge 92 from a closed position (FIG. 4A), in which cargo bed 80 forms a cover for cargo box 60 defining the lower storage space within cargo box 60 and below cargo bed 80, and an open position (FIG. 4B), in which cargo bed 80 provides access to the lower storage space within cargo box 60. In both the open and closed positions, cargo bed 80 defines the upper storage space above floor 82 and below tire rack 110. Also, in both the open and closed positions of cargo bed 80, tire rack 110 provides the addition cargo space necessary to support spare tire 32. Tire rack 110 pivots relative to cargo bed 80 as cargo bed 80 transitions between the open and closed position via linkage system 104. The forward and/or aft links of linkage system 104 may be struts that serve as a lift assist system to reduce the force required to open cargo bed 80.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:
1. An off-road vehicle comprising:
a frame assembly;
a powertrain coupled to the frame assembly;
a plurality of wheels rotatably coupled to the frame assembly with at least one of the wheels operatively coupled to the powertrain;
a seat assembly coupled to the frame assembly;
a cargo box coupled to the frame assembly aft of the seat assembly, the cargo box including a floor and a plurality of side walls;

a cargo bed pivotally coupled relative to the cargo box about a forward hinge, the cargo bed including a floor and a plurality of side walls forming an upper storage space; and an accessory rack pivotally coupled relative to the cargo bed and the frame assembly;

wherein, the cargo bed is tiltable between a closed position, in which the cargo bed is a cover for the cargo box forming a lower storage space within the cargo box below the cargo bed, and an open position, in which the cargo bed provides access to the lower storage space; and wherein, the accessory rack is positioned above and is tiltable with the cargo bed.

2. The off-road vehicle as recited in claim 1 further comprising a locking assembly configured to selectively secure the cargo bed to the cargo box in the closed position such that the lower storage space is a secure storage space.

3. The off-road vehicle as recited in claim 1 further comprising a lift assist element disposed between the cargo bed and the cargo box.

4. The off-road vehicle as recited in claim 1 wherein, the accessory rack is a tire rack.

5. The off-road vehicle as recited in claim 4 further comprising a spare tire coupled to the tire rack.

6. The off-road vehicle as recited in claim 1 further comprising a linkage system including aft links pivotally coupling the accessory rack to the cargo bed and forward links pivotally coupling the accessory rack to the frame assembly.

7. The off-road vehicle as recited in claim 6 wherein, the linkage system further comprises a lift assist system.

8. The off-road vehicle as recited in claim 7 wherein, the lift assist system further comprises at least one strut.

9. An off-road vehicle comprising:

a frame assembly;

a powertrain coupled to the frame assembly;

a plurality of wheels rotatably coupled to the frame assembly with at least one of the wheels operatively coupled to the powertrain;

a seat assembly coupled to the frame assembly;

a cargo box coupled to the frame assembly aft of the seat assembly, the cargo box including a floor and a plurality of side walls;

a cargo bed pivotally coupled relative to the cargo box about a forward hinge, the cargo bed including a floor and a plurality of side walls forming an upper storage space; and an accessory rack pivotally coupled relative to the cargo bed and the frame assembly;

wherein the cargo bed is tiltable between closed and open positions;

wherein, in the closed position, the cargo bed is a cover having a sealing engagement with the cargo box and forming a lower storage space within the cargo box below the cargo bed;

wherein, in the open position, the cargo bed provides access to the lower storage space; and wherein the accessory rack is positioned above and is tiltable with the cargo bed.

10. The off-road vehicle as recited in claim 9 wherein, in the closed position, the cargo bed has a water resistant sealing engagement with the cargo box.

11. The off-road vehicle as recited in claim 9 wherein, in the closed position, the cargo bed has a waterproof sealing engagement with the cargo box.

12. The off-road vehicle as recited in claim 9 further comprising a locking assembly configured to selectively secure the cargo bed to the cargo box in the closed position such that the lower storage space is a secure storage space.

13. The off-road vehicle as recited in claim 9 wherein the accessory rack is a tire rack.

14. The off-road vehicle as recited in claim 13 further comprising a spare tire coupled to the tire rack.

15. The off-road vehicle as recited in claim 9 further comprising a linkage system including aft links pivotally coupling the accessory rack to the cargo bed and forward links pivotally coupling the accessory rack to the frame assembly.

16. An off-road vehicle comprising:

a frame assembly;

a powertrain coupled to the frame assembly;

a plurality of wheels rotatably coupled to the frame assembly with at least one of the wheels operatively coupled to the powertrain;

a seat assembly coupled to the frame assembly;

a cargo box coupled to the frame assembly aft of the seat assembly, the cargo box including a floor and a plurality of side walls;

a cargo bed pivotally coupled relative to the cargo box about a forward hinge, the cargo bed including a floor and a plurality of side walls forming an upper storage space;

a storage container positioned in a forward portion of the cargo box below the cargo bed, the storage container having an access panel, the storage container forming a forward storage space within the cargo box; and an accessory rack pivotally coupled relative to the cargo bed and the frame assembly;

wherein the cargo bed is tiltable between closed and open positions;

wherein, in the closed position, the cargo bed is a cover for the cargo box forming a lower storage space within the cargo box below the cargo bed;

wherein, in the open position, the cargo bed provides access to the lower storage space and the forward storage space; and wherein the accessory rack is positioned above and is tiltable with the cargo bed.

17. The off-road vehicle as recited in claim 16 further comprising a locking assembly configured to selectively secure the cargo bed to the cargo box in the closed position such that the lower storage space and the forward storage space are secure storage spaces.

18. The off-road vehicle as recited in claim 17 wherein the floor of the cargo box includes at least one receiver and the cargo bed includes at least one rotatable lock, the at least one receiver and the at least one rotatable lock forming the locking assembly.

19. The off-road vehicle as recited in claim 16 wherein the accessory rack is a tire rack.

20. The off-road vehicle as recited in claim 16 further comprising a linkage system including aft links pivotally coupling the accessory rack to the cargo bed and forward links pivotally coupling the accessory rack to the frame assembly.

* * * * *